(12) United States Patent
Zhang et al.

(10) Patent No.: US 8,645,702 B2
(45) Date of Patent: *Feb. 4, 2014

(54) METHOD AND APPARATUS TO USE IDENTITY INFORMATION FOR DIGITAL SIGNING AND ENCRYPTING CONTENT INTEGRITY AND AUTHENTICITY IN CONTENT ORIENTED NETWORKS

(75) Inventors: Xinwen Zhang, San Jose, CA (US); Guangyu Shi, Cupertino, CA (US)

(73) Assignee: Futurewei Technologies, Inc., Plano, TX (US)

( * ) Notice: Subject to any disclaimer, the term of this patent is extended or adjusted under 35 U.S.C. 154(b) by 150 days.

This patent is subject to a terminal disclaimer.

(21) Appl. No.: 13/191,610

(22) Filed: Jul. 27, 2011

(65) Prior Publication Data

US 2012/0166806 A1    Jun. 28, 2012

Related U.S. Application Data

(60) Provisional application No. 61/427,551, filed on Dec. 28, 2010.

(51) Int. Cl.
*H04L 9/32* (2006.01)
*G06F 15/16* (2006.01)
*G06F 15/177* (2006.01)

(52) U.S. Cl.
USPC ............ 713/176; 709/229; 709/221; 709/245

(58) Field of Classification Search
USPC .......... 713/168–174, 182–186, 202; 709/225, 709/229; 726/2–8
See application file for complete search history.

(56) References Cited

U.S. PATENT DOCUMENTS 6,473,800 B1 * 10/2002 Jerger et al. ............ 709/226
2009/0138486 A1    5/2009 Hydrie et al.

FOREIGN PATENT DOCUMENTS

| CN | 101390070 A | 3/2009 |
|----|-------------|--------|
| CN | 101500146 A | 8/2009 |
| WO | 2006052736 A2 | 5/2006 |

OTHER PUBLICATIONS

Networking Named Content, Jacobson et al., CoNEXT'09, Dec. 1-4, 2009, p. 1-12.*
Parc, "Named Data Networking (NDN) Project Overview," Technical Report NDN-001, http://named-data.org/, Oct. 2010, 2 pages.
"ID based Cryptography," Wikipedia, http://en.wikipedia.org/wiki/ID-based_cryptography, Sep. 21, 2010, 2 pages.
Oltsik, J., "The True Costs of E-mail Encryption," Enterprise Strategy Group, Jun. 2010, 12 pages.
Appenzeller, G., et al., "Minimal-Overhead IP Security Using Identity Based Encryption," Stanford University, 2002, 12 pages.

(Continued)

Primary Examiner — Evans Desrosiers
(74) Attorney, Agent, or Firm — Conley Rose, P.C; Grant Rodolph; Brandt D. Howell

(57) ABSTRACT

A content router comprising storage configured to cache, in a content oriented network (CON), a content object with a signature signed by a publisher based on a known identity to a subscriber; and a transmitter coupled to the storage and configured to forward the content object with the signature upon request to the subscriber, wherein the subscriber uses the signature to verify one of the content object's integrity and the content object's authenticity based on the known identity without verifying a trust of a publisher key for the publisher, and wherein the known identity is trusted by the publisher and does not require verifying trust from the publisher.

18 Claims, 11 Drawing Sheets

(56) References Cited

OTHER PUBLICATIONS

Boldyreva, A., et al., "Identity- Based Encryption With Efficient Revocation," Proceedings of ACM Conference on CCS, 2008, 31 pages.
Boneh, D., et al., "Identity-Based Encryption From the Weil Pairing," SIAM Journal of Computing, vol. 32, No. 3, 2003, pp. 586-615.
Boneh, D., et al., "Hierachical Identity Based Encryption with Constant Size Ciphertext," Advances in Cryptology-Euro-Crypt 2005, Lecture Notes in Computer Science, vol. 3493, Jun. 20, 2005, pp. 440-456.
Cocks, C., "An Identity Based Encryption Scheme Based On Quadratic Residues," Communications-Electronics Security Group, 2001, 4 pages.
Hess, F., "Efficient Identity Based Signature Schemes Based On Pairings," University of Bristol, Proceedings of ACM SIGCOMM, 2007, 15 pages.
Jacobson, V., et al., "Networking Named Content," PARC, Dec. 1-4, 2009, 12 pages.
Jacobson, V., et al., "VoCCN: Voice Over Content- Centric Networks," PARC, Dec. 1, 2009, 6 pages.
Koponen, T., et al., "A Data-Oriented (and Beyond) Network Architecture," SIGCOMM, Aug. 27-31, 2007, 12 pages.
Schridde, C., et al., "An Identity-Based Key Agreement Protocol for the Network Layer," Springer-Verlag Berlin Heidelberg, 2008, pp. 409-422.
Shamir, A., et al., "Identity-Based Cryptosystems and Signatures Schemes," Springer-Verlag Berlin Heidelberg, 1985, pp. 47-53.
Smetters, D., et al., "Securing Network Content," PARC, 2009, 7 pages.
Smith, M., et al., "Securing Mobile Phone Calls with Identity- Based Cryptography," University of Marburg, 11 pages.
Foreign Communication From A Related Counterpart Application, PCT Application PCT/CN2011/083727, International Search Report dated Mar. 15, 2012, 4 pages.
Foreign Communication From A Related Counterpart Application, PCT Application PCT/CN2011/083727, Written Opinion dated Mar. 15, 2012, 8 pages.

\* cited by examiner

METHOD AND APPARATUS TO USE IDENTITY INFORMATION FOR DIGITAL SIGNING AND ENCRYPTING CONTENT INTEGRITY AND AUTHENTICITY IN CONTENT ORIENTED NETWORKS

CROSS-REFERENCE TO RELATED APPLICATIONS

The present application claims the benefit of U.S. Provisional Patent Application No. 61/427,551 filed Dec. 28, 2010 by Xinwen Zhang et al. and entitled "Method and Apparatus to Use Identify Information for Digital Signing and Verifying Content Integrity and Authenticity in Content Oriented Networks," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

In a content oriented network (CON), a content router is responsible for routing user requests and content to proper recipients. In the CON, a domain-wide unique name is assigned to each entity that is part of a content delivery framework. The entities may comprise data content, such as video clips or web pages, and/or infrastructure elements, such as routers, switches, or servers. The content router uses name prefixes, which can be full content names or proper prefixes of content names instead of network addresses, to route content packets within the content network.

In CONs, content delivery including publishing, requesting, managing (e.g., modification, deletion, etc.) may be based on content name and not content location. One aspect of CONs that may be different from traditional Internet Protocol (IP) networks is the ability of CONs to interconnect multiple geographical points and cache content temporarily or on a more persistent basis. This may allow content to be served from the network instead of an original server, and thus may substantially improve the user experience.

SUMMARY

In one embodiment, the disclosure includes a content router comprising storage configured to cache, in a content oriented network (CON), a content object with a signature signed by a publisher based on a known identity to a subscriber; and a transmitter coupled to the storage and configured to forward the content object with the signature upon request to the subscriber, wherein the subscriber uses the signature to verify one of the content object's integrity and the content object's authenticity based on the known identity without verifying a trust of a publisher key for the publisher, and wherein the known identity is trusted by the publisher and does not require verifying trust from the publisher.

In another embodiment, the disclosure includes a network component comprising a receiver in a content router configured to receive content from a publisher encrypted with a master key (MK) generated by a Private Key Generator (PKG) and to receive the encrypted content from a cache in a CON, and a transmitter configured to send the encrypted content to the cache and to send the encrypted content from the cache to a subscriber that decrypts the encrypted content using a private key obtained using an identity associated with the publisher or the content and a master secret key (MSK) generated by the PKG.

In a third aspect, the disclosure includes a network apparatus implemented method comprising receiving a content object with a signature signed from a publisher using a private key that is obtained using a public identity known in a CON, storing the content object with the signature in the CON, and, upon receiving a content request, forwarding the content object with the signature to a subscriber that verifies the signature using the public identity known in the CON.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

A user may not access the original server to retrieve a content object in the CON. As such, guaranteeing content integrity (i.e., guaranteeing that the content has not been altered by a third party) and authenticity (i.e., guaranteeing that the content originates from the publisher to which it is attributed) may become necessary. Digital signature is a general approach to enable content integrity and authenticity in the CON. Typically, a content publisher may sign a content object with a publisher's private key. The signature may be attached to the content or separately distributed via the CON. When a subscriber receives the content, the subscriber may verify the integrity of the content using a publisher's public key. The prerequisite of this mechanism is that a subscriber needs to obtain a publisher's public key, which may be distributed within the CON, as suggested for Content Centric Network (CCN)/Named Data Networking (NDN) like network architectures. However, the trust of a public key of the publisher may also require verification with another public key, which is usually a public certificate issued by a global trusted certificate authority (CA).

Disclosed herein is a system and method for using an identity of a content to sign and verify the integrity and authenticity of a content object in the CON. The identity of the content may also be used as part of an encryption scheme to protect the privacy of the content object in the CON. The identity may be the name or partial name (prefix) of the content, which may be part of the content metadata. Alternatively, the identity may be an identity of the publisher of the content. In this case, the identity may be any publicly unique identifier (id) of the publisher (e.g., email address, phone number), which may not be the publisher's public key. The identity may also be a locally unique identity, e.g., a user or department name within an organization. Using content or publisher identity may release the burden of a subscriber to obtain and verify the trust of a public key of a publisher since the trust is built on a known identity of a content object or a publisher. Binding trust on a content object, e.g., with the content name, instead of binding trust of a content object with its publisher may apply to a plurality of real application scenarios.

Figure 1:
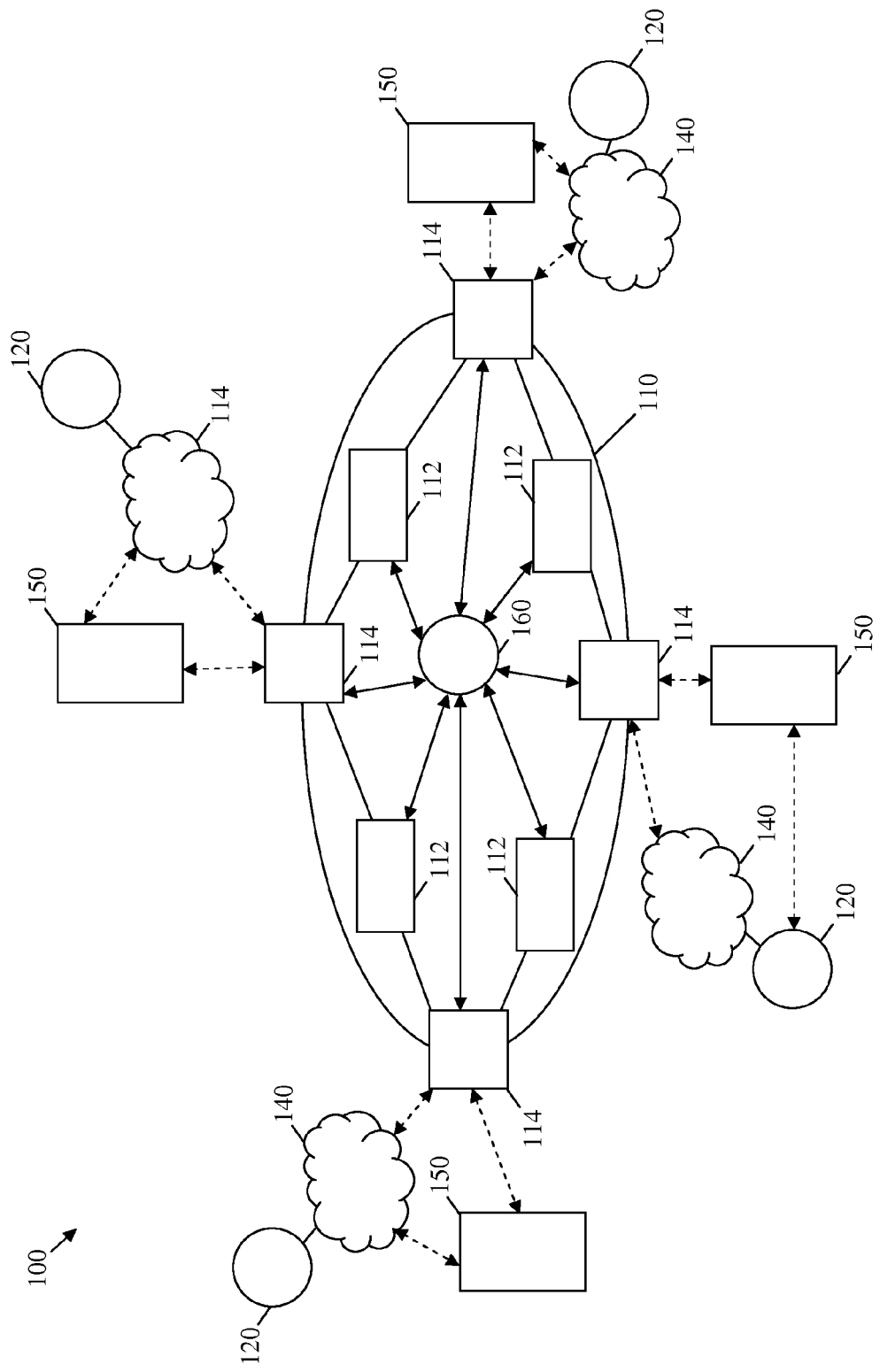
FIG. 1 is a schematic diagram of one embodiment of a CON.

FIG. 1 illustrates an embodiment of a CON 100, where content may be routed based on name prefixes and delivered to customers based on request. The CON 100 may comprise a network domain 110 that comprises a plurality of nodes, such as an Internet Protocol (IP) domain, a Multiprotocol Label Switching (MPLS) domain, or an Ethernet domain. The network domain 110 may comprise a plurality of internal nodes 112 and a plurality of content routers 114, which may be coupled to each other via network links, e.g., fixed connections. The content routers 114 may be coupled to a plurality of customer nodes 120, via a plurality of access networks 140, and to a plurality of customer sites 150, as shown in FIG. 1. Communications between the content routers 114, the customer nodes 120, the access networks 140, and the customer sites 150 are indicated by dashed arrow lines in FIG. 1. The CON 100 may also comprise a management plane 160 that may communicate with the internal nodes 112 and/or the content routers 114 (indicated by solid arrow lines in FIG. 1).

The internal nodes 112 may be any nodes, devices, or components that support transportation of traffic, e.g., frames and/or packets, through the CON 100. The internal nodes 112 may pass the traffic onto or receive the traffic from other nodes in the same network domain 110. For example, the internal nodes 112 may be routers, switches, or bridges, such as backbone core bridges (BCBs), provider core bridges (PCBs), or label switch routers (LSRs). The internal nodes 112 may also be content routers 114 that forward content based on content name prefixes. The content routers 114 may be any nodes, devices or components that support transportation of traffic between the network domain 110 and external components. The content routers 114 may be edge nodes that forward content traffic from the internal nodes 112 to the customer nodes 120 and/or the customer sites 150, e.g., based on customer request or demand. The content routers 114 may also receive content requests from the customer nodes 120. For example, the content routers may be routers or bridges, such as backbone edge bridges (BEBs), provider edge bridges (PEBs), or label edge routers (LERs) that forward content based on content name prefixes. The internal nodes 112 and/or the content routers 114 may comprise or may be coupled to a plurality of content servers that store or cache content, which may be provided to customers or subscribers, e.g., upon demand.

The customer nodes 120 may be nodes, devices, or components configured to deliver content to a user or customer and receive content requests from the customer nodes 120. For instance, the customer nodes 120 may be fixed or mobile user-oriented devices, such as desktop computers, notebook computers, personal digital assistants (PDAs), or cellular telephones. Alternatively, the customer nodes 120 may be connectivity devices at customer premises, such as modems or set-top boxes. The customer nodes 120 may also comprise customer equipment (not shown) that may be configured to receive content from the content routers 114, via the access networks 140, and distribute the content to a plurality of customers. For instance, the customer nodes 120 may comprise optical network terminals (ONUs) and/or very high bit rate digital subscriber line (VDSL) transceiver units at residential locations (VTU-Rs). The access networks 140 may be any networks that provide access to the content in the CON 100, such as Virtual Private Networks (VPNs). The customer sites 150 may be any sites or office environments configured to receive content from the content routers 114 and may send the content to corresponding customer nodes 120, via the access networks 140. The customer sites 150 may also receive content requests from the customer nodes 120 and send the content requests to the content routers 114.

The CON 100 may be configured to ensure data integrity for a plurality of users associated with the customer nodes 120 and/or the customer sites 150. To provide data integrity, content may be received and cached with a signature from a publisher. The signature may then be verified by a subscriber to determine the integrity of the content. The publisher and subscriber may use a public/private key to sign and verify the content, respectively. Typically, the public/private key pair may be provided by a public key infrastructure (PKI). Such scheme may require distributing the public key to subscribers and using an additional verification mechanism by the subscribers to trust the public key, e.g., using certificates from a CA. To avoid using such additional mechanism, an identity based signature scheme may be used instead to ensure the integrity of content in the CON 100. Accordingly, an identity associated with the publisher or content that is known to the subscriber may be received and cached with the content. The subscriber may then receive the known identity with the content and recognize the identity to determine content integrity, without requiring additional identity or key distribution and/or trust mechanisms. Additionally, to provide data security and privacy, the identity may be used to decrypt a content that is encrypted without using additional encryption key distribution and/or trust mechanisms, as described in detail below.

The identity associated with the publisher or content and known to the subscriber may be a global or local public identity of the publisher or may be a name or a name prefix of the content or content object. Such identity may have existing built trust with the system's infrastructure, e.g., an organization of the publisher and subscriber or a global name or address system. For example, the identity may be an email address, a phone number, a department name, or any other known identity known to the system's infrastructure. As such, the subscriber may use the identity to verify content integrity and authenticity without relying on extra trust infrastructures, such as a PKI and/or a CA.

Figure 2:
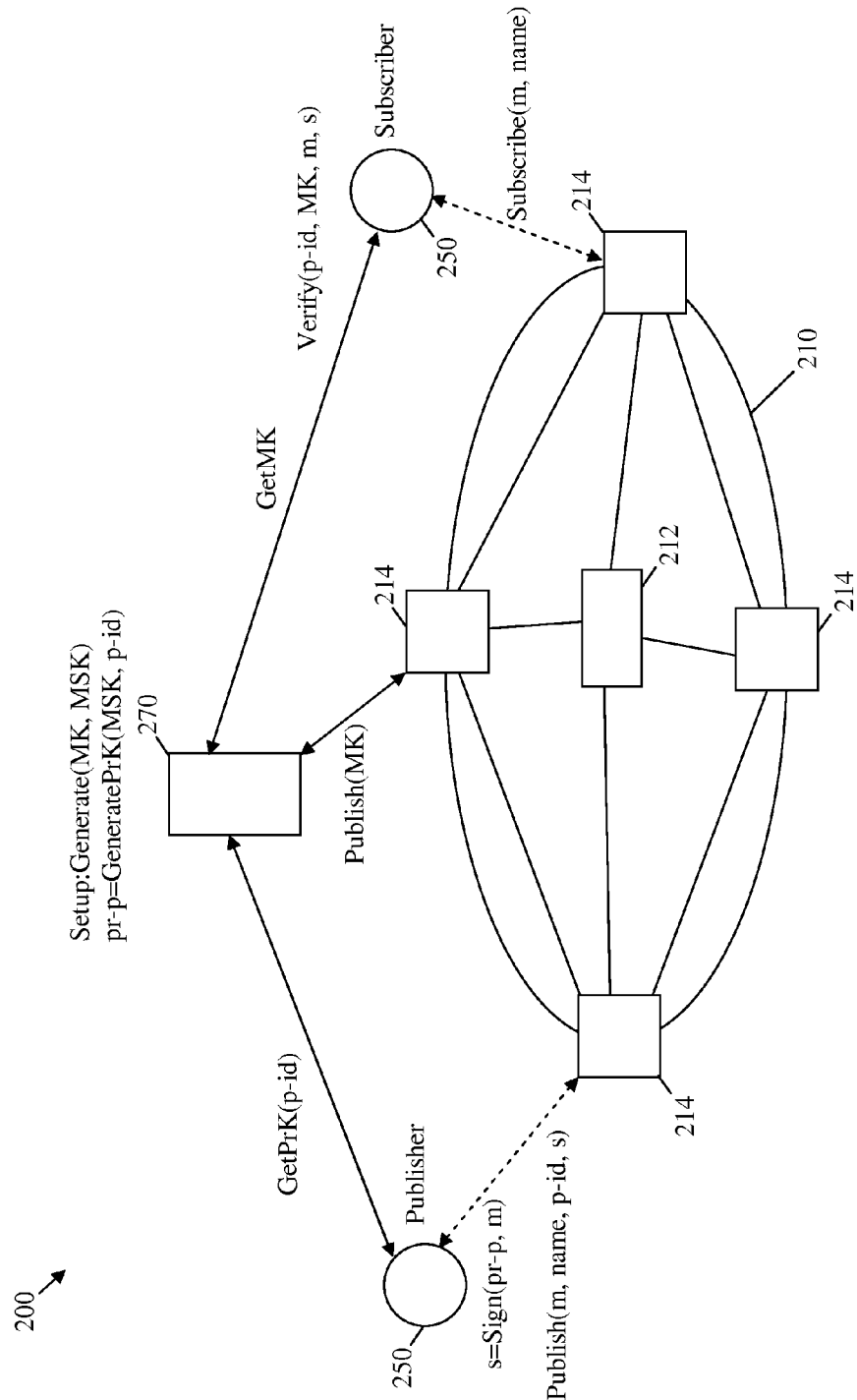
FIG. 2 is a schematic diagram of an embodiment of a content authentication scheme.

FIG. 2 illustrates an embodiment of a content authentication scheme 200 for ensuring content integrity and authenticity for users of a CON. The content authentication scheme 200 may be implemented in a CON 210, which may be similar to the CON 100. The CON 210 may comprise a plurality of internal nodes 212 and content routers 214, which may be configured similar to the internal nodes 112 and the content routers 114, respectively. The content routers 214 may be coupled to a plurality of customer nodes/sites 250, similar to the customer nodes 120/customer sites 150, e.g., via a plurality of access networks (not shown). The customer nodes/sites 250 may be configured to publish/subscribe content in the CON 210. The CON 210 may also comprise or may be coupled to a PKG 270 that may be configured to generate a plurality of private keys for a plurality of content publishers.

In the content authentication scheme 200, each customer node/site 250 may use general algorithms or functions, such as for signing content, publishing content, subscribing content, and verifying content, as described below. The algorithms or functions may be any cryptographic algorithms or functions known or used in existing CONs, e.g., using algorithm libraries such as open Secure Sockets Layer (openSSL). Each user or customer node/site 250 that may be a publisher may also have a public identity (p-id), which may be used to obtain a private key for the publisher (pr-p) for signing content. The public identity (p-id) may also be known and used by a subscriber for verifying the content. For instance, the public identity may be a publicly known identity associated with the publisher, such as the publisher's email address, phone number, organization name, a locally unique identity (e.g., a user or department name within an organization), or other publicly known identity of the publisher that is known to a subscriber of the CON 210.

For instance, a first customer node/site 250 may be a publisher that publishes content for a user to the CON 210, via a content router 214. The publisher may authenticate with the PKG 270 using the public identity (p-id) to obtain the private key (pr-p), which may then be kept secret by the publisher. The PKG 270 may generate a system-wide public parameter or a MK and a private parameter or MSK, e.g., using the algorithm/function Setup:Generate(MK, MSK). MK/MSK may be generated as part of a setup operation of the PKG 270. For instance, when the PKG 270 starts or goes online, the PKG 270 may run setup to generate MK and MSK before handling any customer request. MK may also be published in the CON 210, e.g., using the algorithm/function Publish (MK), without distributing MSK.

Subsequently, the publisher may request from the PKG 270 a private key for signing the publisher's content from the PKG 270 using p-id, e.g., using the algorithm/function GetPrk(p-id). The PKG 270 may then use MSK and p-id to generate pr-p, e.g., using the algorithm/function GeneratePrK(MSK, p-id). Generating MK and MSK using Setup:Generate(MK, MSK) and getting pr-p using GetPrk(p-id) may be implemented only once by the PKG 270 and the publisher, respectively, for example offline independent of the content publishing process (indicated by solid arrow lines in FIG. 2). The publisher may then sign a content object, e.g., using the algorithm/function Sign(pr-p, m), and publish the content with the signature(s) using p-id, e.g., using the algorithm/function Publish(m, name, p-id, s). The signature(s) may be part of the metadata of the cached or stored content. In some embodiments, the public identity (p-id) of the publisher may also be included as part of the metadata of the content. The published content may then be forwarded by the content router 214 and stored or cached in the CON 210.

A second customer node/site 250 that may be a subscriber may then obtain the content from the CON 210. The second customer node/site 250 may subscribe the content with the same or another content router 214, e.g., using the algorithm/function Subscribe(m, name). The p-id of the publisher may be known to the subscriber or may be obtained from the metadata of the content. Specifically, the subscriber may obtain MK from the PKG 270, e.g., using the algorithm/function GetMK, and then verify the integrity and authenticity of the subscribed content by examining the signature(s) using p-id and MK, e.g., using the algorithm/function Verify (p-id, MK, m, s). The subscriber may obtain MK from the PKG 270 using GetMK only once, for example offline independent of the content publishing process (indicated by solid arrow lines in FIG. 2). In some scenarios, the subscriber may verify the integrity of the subscribed content by first generating a publisher public key (pb-p), e.g., using the algorithm/function GeneratePbK(MK, p-id), and then verifying the content based on pb-p, e.g., using Verify (pb-p, m, s). This may be equivalent to using Verify (p-id, MK, m, s), since pb-p is internally generated by the subscriber and is a function of p-id and MK.

In the content authentication scheme 200, the operation of Setup for generating MK and MSK may be a one-time operation, e.g., implemented only once. For example, the MK/MSK parameters may be common parameters for all the entities (publishers and subscribers) in the system. The operation of GetPrk may be a one-time operation for the publisher and used for publisher all content of the same publisher. The operation of GetMK may be a one-time operation for the subscriber, since it is not dependent on a particular publisher or a content object. The operation of GeneratePrK( ) may also be a one-time operation for a single identity, e.g., the publisher. Further, retrieving the private key for the publisher (pr-p) from the PKG 270 may require a secure channel between the publisher and the PKG 270. However, retrieving MK from the PKG 270 may not require a secure channel between the subscriber and the PKG 270.

Figure 3:
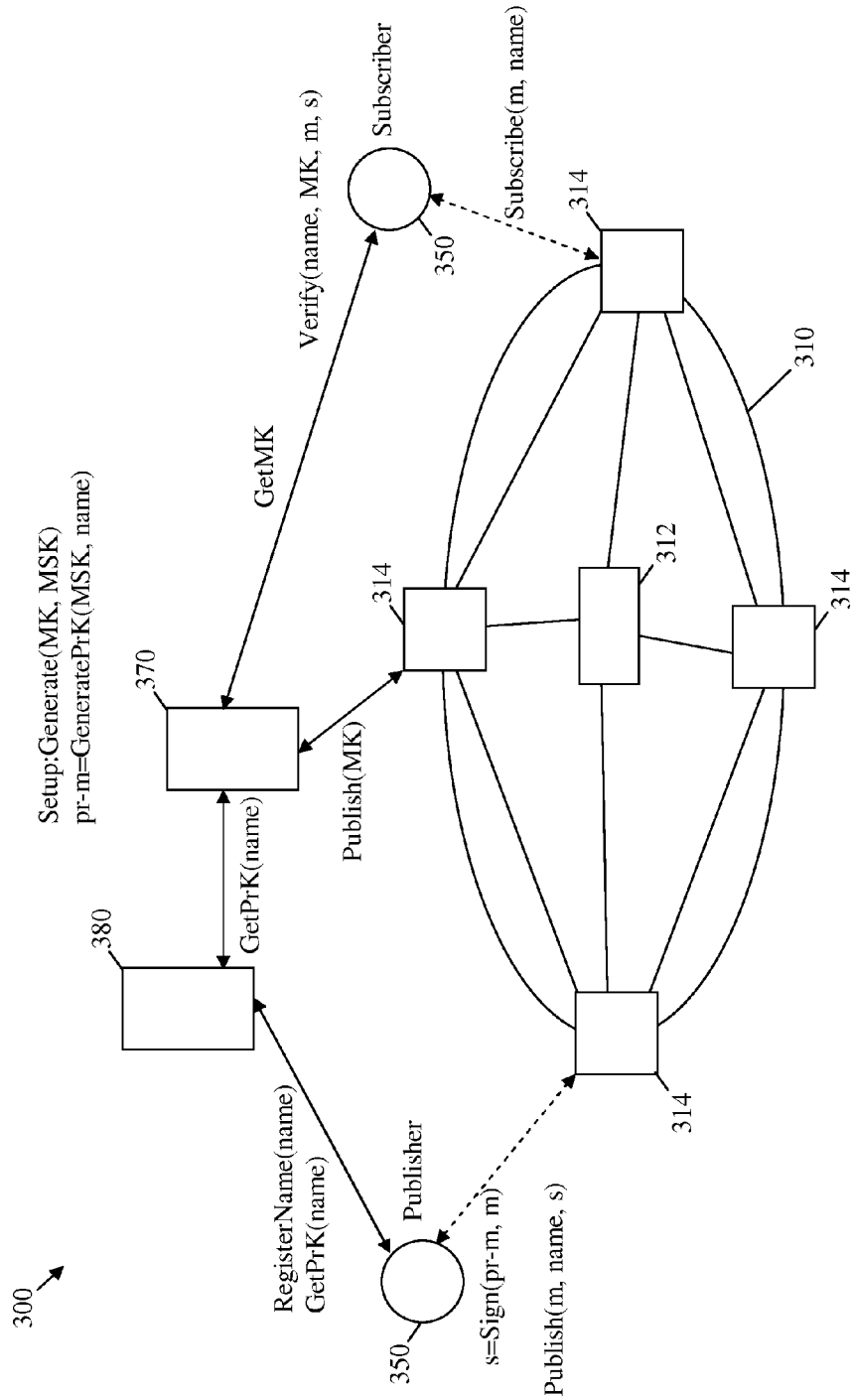
FIG. 3 is a schematic diagram of another embodiment of a content authentication scheme.

FIG. 3 illustrates an embodiment of another content authentication scheme 300 for ensuring content integrity and authenticity for users of a CON. The content authentication scheme 300 may be implemented in a CON 310, which may be similar to the CON 100. The CON 310 may comprise a plurality of internal nodes 312 and content routers 314, which may be configured similar to the internal nodes 112 and the content routers 114, respectively. The content routers 314 may be coupled to a plurality of customer nodes/sites 350, similar to the customer nodes 120/customer sites 150, e.g., via a plurality of access networks (not shown). The customer nodes/sites 350 may be configured to publish/subscribe content in the CON 310. The CON 310 may comprise or may be coupled to a PKG 370, which may be configured to generate a plurality of private keys for a plurality of content publishers. The CON 310 may also comprise or may be coupled to a content name registration service (NRS) 380, which may be configured to register a plurality of content names for the publishers. The content names may be selected by the publishers. The NRS 380 may be a local or global entity within an organization of the publishers and may obtain from the PKG 270 a plurality of private keys for the publishers (pr-m) associated with the registered content names of the publishers. The NRS 380 may verify that the content name from a publisher is new and not previously registered before registering the content name and obtain a private key for the publisher associated with or corresponding to the registered content name.

In the content authentication scheme 300, each customer node/site 350 may use general algorithms or functions, such as for signing content, publishing content, subscribing content, and verifying content, as described below. The algorithms or functions may be any cryptographic algorithms or functions known or used in existing CONs, e.g., using algorithm libraries such as openSSL. Each user or customer node/site 350 may obtain a private key for the publisher (pr-m) for signing content based on the content name or prefix (name). The content name or prefix may be known and used by a subscriber to verify the content.

For instance, a first customer node/site 350 may be a publisher that publishes content for a user to the CON 310, via a content router 314. The publisher may select a content name and register the content name with the NRS 380, e.g., using the algorithm/function RegisterName(name). The NRS 380 may then obtain a corresponding private key for the publisher (pr-m) from the PKG 370, e.g., using the algorithm/function GetPrK(name). Subsequently, the publisher may obtain or receive pr-m from the NRS 380, e.g., using the algorithm/function GetPrk(name). Similar to the PKG 270, the PKG 370 may generate a system-wide public parameter or a master key (MK) and a private parameter or master secret key (MSK), e.g., using the algorithm/function Setup:Generate (MK, MSK). MK/MSK may be generated as part of a setup operation of the PKG 370, e.g., at the start time, before handling any customer request. MK may also be published in the CON 310, e.g., using the algorithm/function Publish (MK), without distributing MSK.

Subsequently, the NRS 380 may request from the PKG 370 a private key for signing the publisher's content from the PKG 370 using GetPrk(name), as described above. The PKG 370 may then use MSK and the content name or prefix to generate pr-m, e.g., using the algorithm/function GeneratePrK(MSK, name). Generating MK and MSK using Setup:Generate(MK, MSK) and getting pr-m using GetPrk(name) may be implemented only once by the PKG 370 and the publisher, respectively, for example offline independent of the content publishing process (indicated by solid arrow lines in FIG. 3). The publisher may then sign a content object, e.g., using the algorithm/function Sign(pr-m, m), and publish the content with the signature(s) using the algorithm/function Publish(m, name, s). The signature(s) may be part of the metadata of the cached or stored content. The published content may then be forwarded by the content router 314 and stored or cached in the CON 310.

A second customer node/site 350 that may be a subscriber may then obtain the content. The second customer node/site 350 may subscribe the content with the same or another content router 314, e.g., using the algorithm/function Subscribe(m, name). Specifically, the subscriber may obtain MK from the PKG 370, e.g., using the algorithm/function GetMK, and then verify the integrity and authenticity of the subscribed content by examining the signature(s) using the content name or prefix and MK, e.g., using the algorithm/function Verify (name, MK, m, s). The subscriber may obtain MK from the PKG 370 using GetMK only once, for example offline independent of the content publishing process (indicated by solid arrow lines in FIG. 3). The subscriber may not need to authenticate with the PKG 370 to obtain MK. In some scenarios, the subscriber may verify the integrity of the subscribed content by first generating a publisher public key (pb-p), e.g., using the algorithm/function GeneratePbK(MK, name), and then verifying the content based on pb-p, e.g., using Verify (pb-p, m, s). This may be equivalent to using Verify(name, MK, m, s), since pb-p is internally generated by the subscriber and is a function of the content name or prefix and MK.

The different operations and parameters used in the content authentication scheme 300 may be implemented in a similar manner as in the case of the content authentication scheme 200. The content authentication scheme 300 may also implement a plurality of flexible security policies that may be supported with the identity-based signature(s). The security policies may include signing multiple content objects that have the same name or prefix with the same private key generated based on the name or prefix. This may enable delegated signing, e.g., where a publisher may delegate its signing operation to another user or service in an organization. The security policies may also allow a subscriber to use the same identity to verify a content that is published by a group or a plurality of publishers using the same name or prefix. Additionally, multiple identities may be used to sign a single content object, e.g., using different names or prefixes or multiple publishers' ids or known identities, such as emails or phone numbers.

Figure 4:
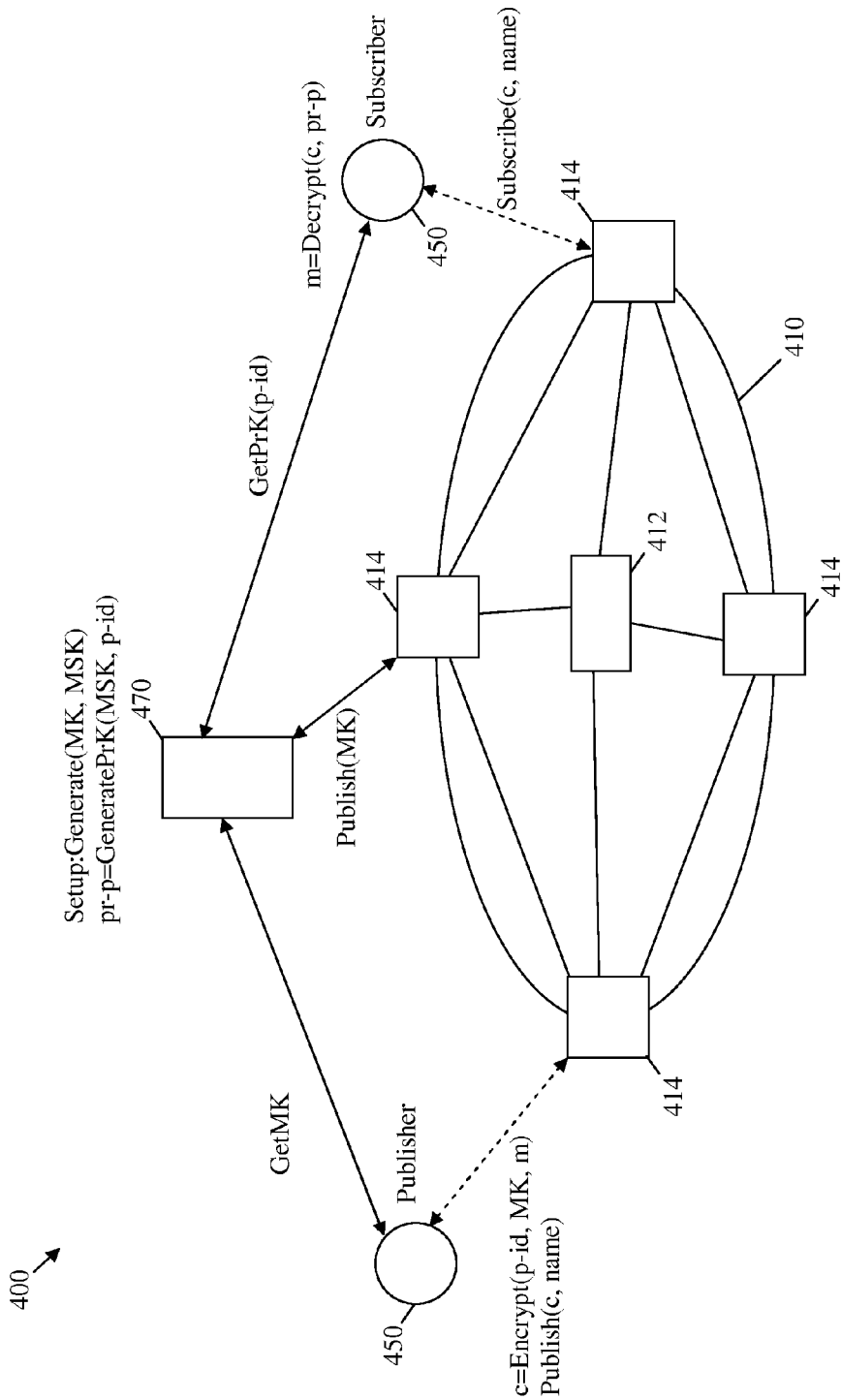
FIG. 4 is a schematic diagram of an embodiment of a content encryption scheme.

FIG. 4 illustrates an embodiment of a content encryption scheme 400 for protecting content and ensuring security and privacy for users of a CON. The content encryption scheme 400 may be implemented in a CON 410, which may be similar to the CON 100. The CON 410 may comprise a plurality of internal nodes 412 and content routers 414, which may be configured similar to the internal nodes 112 and the content routers 114, respectively. The content routers 414 may be coupled to a plurality of customer nodes/sites 440, similar to the customer nodes 120/customer sites 140, e.g., via a plurality of access networks (not shown). The customer nodes/sites 440 may be configured to publish/subscribe content in the CON 410. The CON 410 may also comprise or may be coupled to a Private Key Generator (PKG) 470 that may be configured to generate a plurality of private keys for a plurality of content publishers.

In the content authentication scheme 400, each customer node/site 440 may use general algorithms or functions, such as for signing content, publishing content, subscribing content, and verifying content, as described below. The algorithms or functions may also comprise algorithms or functions for encrypting content and decrypting the content. Each user or customer node/site 440 that may be a publisher may also have a public identity (p-id), which may be used to encrypt content by the publisher. The public identity (p-id) may also be known and used by a subscriber to obtain a private key for the publisher (pr-p) for decrypting the content. For instance, the public identity may be a publicly known identity associated with the publisher, as described in the content authentication scheme 200.

In the content encryption scheme 400, a first customer node/site 440 may be a publisher that publishes content for a user to the CON 410, via a content router 414. The publisher may first obtain a system-wide public parameter or a master key (MK) from the PKG 470, e.g., using the algorithm/function GetMK. The PKG 470 may generate MK and a private parameter or master secret (or private) key (MSK), e.g., using the algorithm/function Setup:Generate(MK, MSK). MK/MSK may be generated as part of a setup operation of the PKG 470. For instance, when the PKG 470 starts or goes online, the PKG 470 may run setup to generate MK and MSK before handling any customer request. MK may also be published in the CON 410, e.g., using the algorithm/function Publish(MK), without distributing MSK. The publisher may obtain MK from the PKG 470 using GetMK only once, for example offline independent of the content publishing process (indicated by solid arrow lines in FIG. 4). The publisher may encrypt content (m) using p-id and MK to obtain an encrypted content (c), e.g., using the algorithm/function Encrypt(p-id, MK, m). The publisher may then publish the encrypted content (c) with the content name (or prefix), e.g., using the algorithm/function Publish(c, name). In some embodiments, the public identity (p-id) of the publisher may be included as part of the metadata of the content. Additionally, the publisher may also sign the content, e.g., as described in the content authentication scheme 200, before or after encrypting and publishing the content. The published content may then be forwarded by the content router 414 and stored or cached in the CON 210.

A second customer node/site 440 that may be a subscriber may then obtain the encrypted content from the CON 410. The second customer node/site 440 may subscribe the encrypted content with the same or another content router 414, e.g., using the algorithm/function Subscribe(c, name). The publisher may request from the PKG 470 a private key for decrypting the encrypted content using p-id, e.g., using the algorithm/function GetPrk(p-id). The p-id of the publisher may be known to the subscriber or may be obtained from the metadata of the content. The PKG 470 may then use MSK and p-id to generate a private key for the publisher (pr-p), e.g., using the algorithm/function GeneratePrK(MSK, p-id). The operation of GeneratePrK( ) may be a one-time operation for a single identity, e.g., the publisher. Further, retrieving the private key for the publisher (pr-p) from the PKG 470 may require a secure channel between the subscriber and the PKG 470. However, retrieving MK from the PKG 470 may not require a secure channel between the publisher and the PKG 470. The subscriber may then decrypt the encrypted content (c) to obtain the original content m using pr-p, e.g., using the algorithm/function Decrypt(c, pr-p). Additionally, if the content is signed by the publisher, the subscriber may verify the subscribed content, e.g., as described in the content authentication scheme 200.

Figure 5:
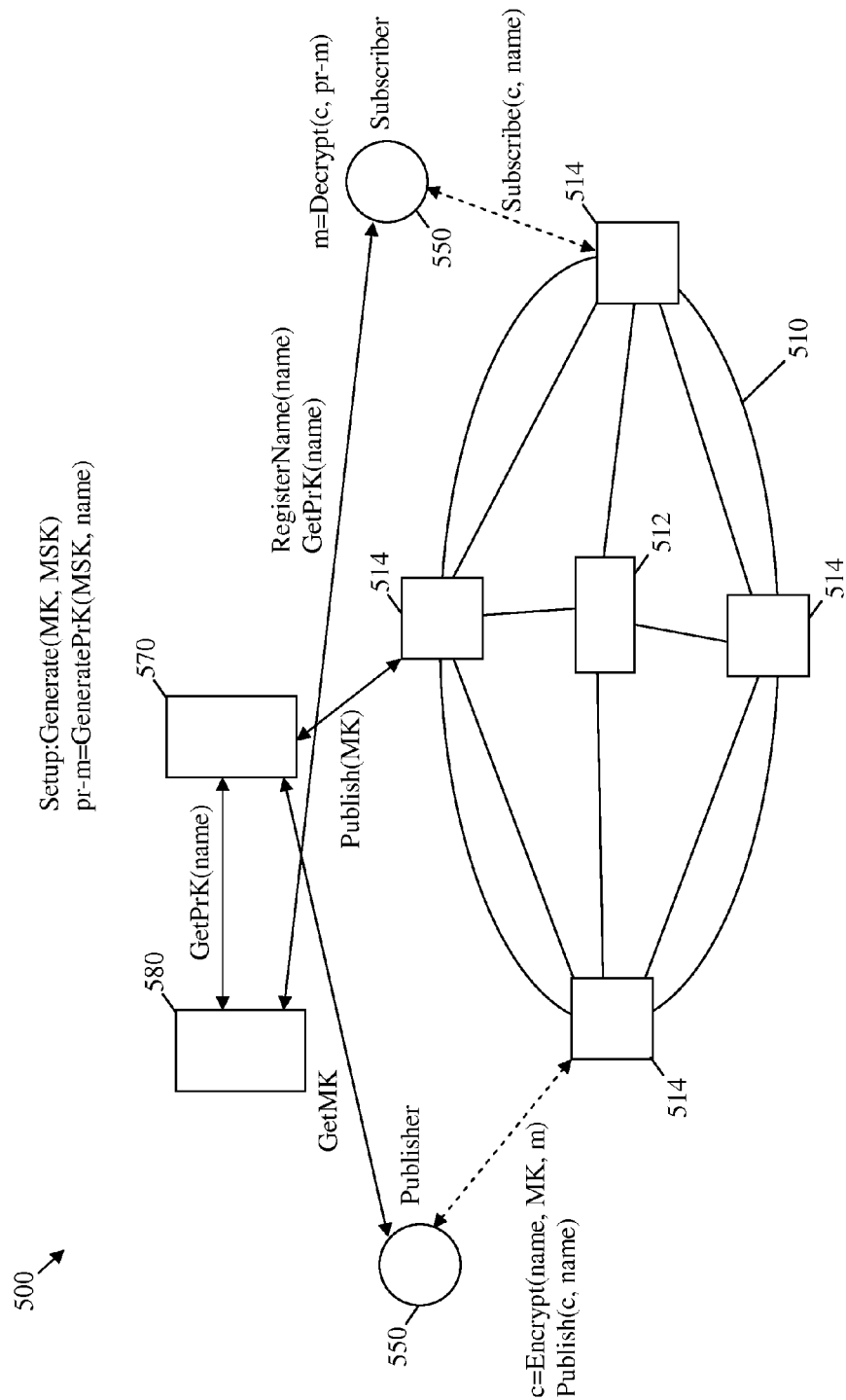
FIG. 5 is a schematic diagram of another embodiment of a content encryption scheme.

FIG. 5 illustrates an embodiment of another content encryption scheme 500 for ensuring content security and privacy for users of a CON. The content encryption scheme 500 may be implemented in a CON 510, which may be similar to the CON 100. The CON 510 may comprise a plurality of internal nodes 512 and content routers 514, which may be configured similar to the internal nodes 112 and the content routers 114, respectively. The content routers 514 may be coupled to a plurality of customer nodes/sites 550, similar to the customer nodes 120/customer sites 150, e.g., via a plurality of access networks (not shown). The customer nodes/sites 550 may be configured to publish/subscribe content in the CON 510. The CON 510 may comprise or may be coupled to a PKG 570, which may be configured to generate a plurality of private keys for a plurality of content publishers. The CON 510 may also comprise or may be coupled to a NRS 580, which may be configured to register a plurality of content names for the publishers. The content names may be selected by the publishers. The NRS 580 may be a local or global entity within an organization of the publishers and may obtain from the PKG 570 a plurality of private keys for the publishers (pr-m) associated with the registered content names of the publishers. The NRS 580 may verify that the content name from a subscriber is new and not previously registered before registering the content name and obtain a private key for the publisher associated with or corresponding to the registered content name.

In the content encryption scheme 500, each customer node/site 550 may use general algorithms or functions, such as for signing content, publishing content, subscribing content, verifying content, encrypting content, and decrypting content, as described below. Each user or customer node/site 550 may use the content name or prefix to encrypt content for publishing. Each user or customer node/site 550 that may be a publisher may also have a public identity (p-id), which may be known and used by a subscriber and used to obtain a private key for the publisher (pr-m) for decrypting the content.

For instance, a first customer node/site 550 may be a publisher that publishes content for a user to the CON 510, via a content router 514. The publisher may first obtain a system-wide public parameter or a master key (MK) from the PKG 570, e.g., using the algorithm/function GetMK. The PKG 570 may generate MK and a private parameter or master secret key (MSK), e.g., using the algorithm/function Setup:Generate(MK, MSK) only once as part of a setup operation, as described in the schemes above. MK may also be published in the CON 510, e.g., using the algorithm/function Publish (MK), without distributing MSK. The publisher may also obtain MK from the PKG 570 using GetMK only once, as described above. The publisher may encrypt content (m) using the content name (or prefix) and MK to obtain an encrypted content (c), e.g., using the algorithm/function Encrypt(name, MK, m). The publisher may then publish the encrypted content (c) with the content name (or prefix), e.g., using the algorithm/function Publish(c, name). In some embodiments, the public identity (p-id) of the publisher may be included as part of the metadata of the content. Additionally, the publisher may also sign the content, e.g., as described in the content authentication scheme 300, before or after encrypting and publishing the content. The published content may then be forwarded by the content router 514 and stored or cached in the CON 510.

A second customer node/site 550 that may be a subscriber may then obtain the encrypted content from the CON 510. The second customer node/site 550 may subscribe the encrypted content with the same or another content router 514, e.g., using the algorithm/function Subscribe(c, name). The publisher may request from the PKG 570 a private key for decrypting the encrypted content using the content name (or prefix), e.g., using the algorithm/function GetPrk(name). The PKG 570 may then use MSK and the content name (or prefix) to generate a private key for the publisher (pr-m), e.g., using the algorithm/function GeneratePrK(MSK, name). The operation of GeneratePrK( ) may be a one-time operation for a single content name or prefix. The subscriber may then decrypt the encrypted content (c) to obtain the original content m using pr-m, e.g., using the algorithm/function Decrypt (c, pr-m). Additionally, if the content is signed by the publisher, the subscriber may verify the subscribed content, e.g., as described in the content authentication scheme 300.

Figure 6:
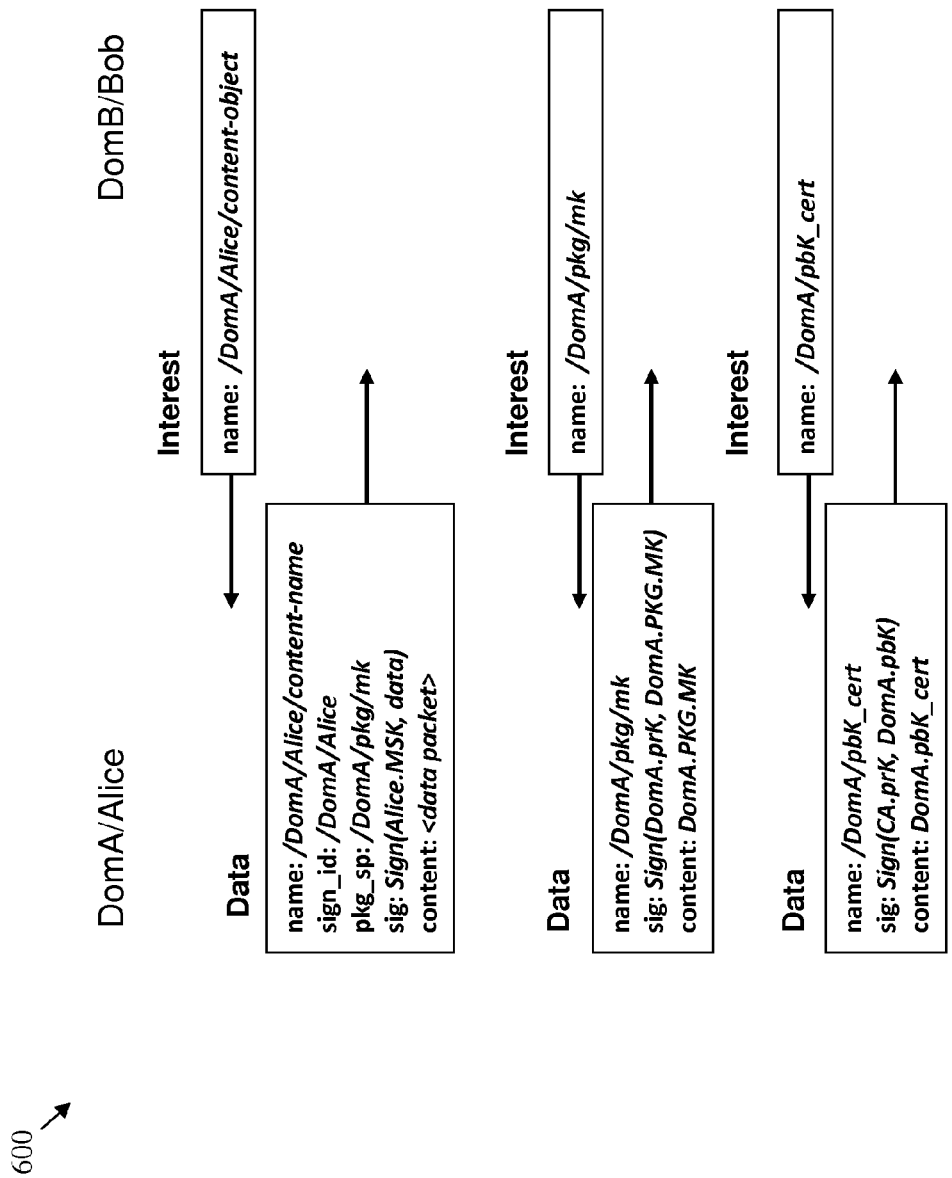
FIG. 6 is a schematic diagram of an embodiment of a hybrid content authentication scheme.

FIG. 6 illustrates an embodiment of a hybrid content authentication scheme 600 that may be used to support large scale CONs or ICNs and improve the scalability of the content authentication schemes 200 and 300. A large scale CON or ICN may comprise a plurality of domains, which may each comprise a plurality of content routers, customer nodes/sites, and a corresponding PKG. The hybrid content authentication scheme 600 may comprise the elements and component of the content authentication scheme 200 or 300 and a PKI and may enable content authentication between the domains, also referred to herein as cross-domain or inter-domain content authentication. The cross or inter-domain content authentication may allow a subscriber in a first domain to verify the authenticity of a signed content by a publisher in a second domain using a signed system-wide public parameter or a master key (MK) of the second domain (according to the content authentication scheme 200 or 300). The subscriber may also authenticate the signed MK using the PKI, e.g., using a public key to verify the MK signed by the publishing domain using a private key.

For instance, a subscriber (Bob) in the first domain (DomB) may request a cached content published by a publisher (Alice) in a second domain (DomA). Thus, the subscriber may request the content object name /DomA/Alice/content-object from a content router in the CON. The content router may return the requested content object that may be signed by a private key for the publisher (Alice.SK) using the content authentication scheme 200 or 300. The subscriber may also obtain (from the PKG of DomA) a MK (/DomA/pkg/sp) that may be signed by a private key for DomA (DomA.prK) using the PKI. The subscriber may verify the authenticity of the received signed content (data) using the signed MK. The subscriber may also verify the authenticity of the signed MK using a public key for DomA (DomA.pbK) corresponding to the public key for DomA (DomA.prK). The public key for DomA (DomA.pbK) may also be obtained using the PKI. The subscriber may also use a certificate from a trusted CA to verify the authenticity of the public key for DomA (DomA.pbK).

In the hybrid content authentication scheme 600, PKG and NRS may be domain or organizational entities that issue a publisher private key, MK, MSK, and register names or prefixes for local users in the corresponding domain. For example, an enterprise may have its own PKG, which is the case in TrendMicro's identity-based email encryption solution for enterprise, as described in the publication entitled "The true costs of e-mail encryption: Trend micro ibe (identity-based) vs. pki encryption," published October 2010 in http://us.trendmicro.com/imperia/md/content/us/pdf/products/enterprise/emailencryption/the_true_cost_of_email_encryption_6-2010.pdf. In some embodiments, a hybrid content encryption scheme may be used based on the PKI and the content encryption scheme 400 or 500, using PKI encryption keys in addition to MK and a know publisher identity or content name (or prefix).

The hybrid content authentication scheme 600 may be implemented as a CCN protocol and may be scalable based on the fact that PKI is deployed in domain or Autonomous System (AS) level in current Internet infrastructure. For instance, Domain Name System Security Extensions (DNSSEC), Internet Protocol Security (IPsec), and server-side Secure Sockets Layer (SSL)/Transport Layer Security (TLS) for web-based Internet services rely on PKI-based trust infrastructure. In these protocols, public keys of domains are certified by trusted CAs, which has proved as a suitable scalable solution. The PKI may be viable for domain level trust management, while identity based content authentication (using the content authentication schemes 200 and 300) and identity based encryption (using the content authentication schemes 400 and 500) may be suitable for end user and device level trust management. In CONS or ICNs, requiring each content provider or consumer to have a public key certificate may be costly and key management may thus become an obstacle for many applications. In this case the hybrid scheme above may overcome such limitations. Further, the hybrid scheme above may not compromise the benefits for content-based trust and privacy protection with identity based content authentication and identity based content encryption. For example, a consumer may only need a domain's public key certificate to verify the authenticity of a PKG's MK. Subsequently, the trust may still be built on top of trusting the identity of the content provider or content name (or prefix), instead of an individual user's public key certificate. Thus, certificate management burden may be limited in the domain level.

Figure 7:
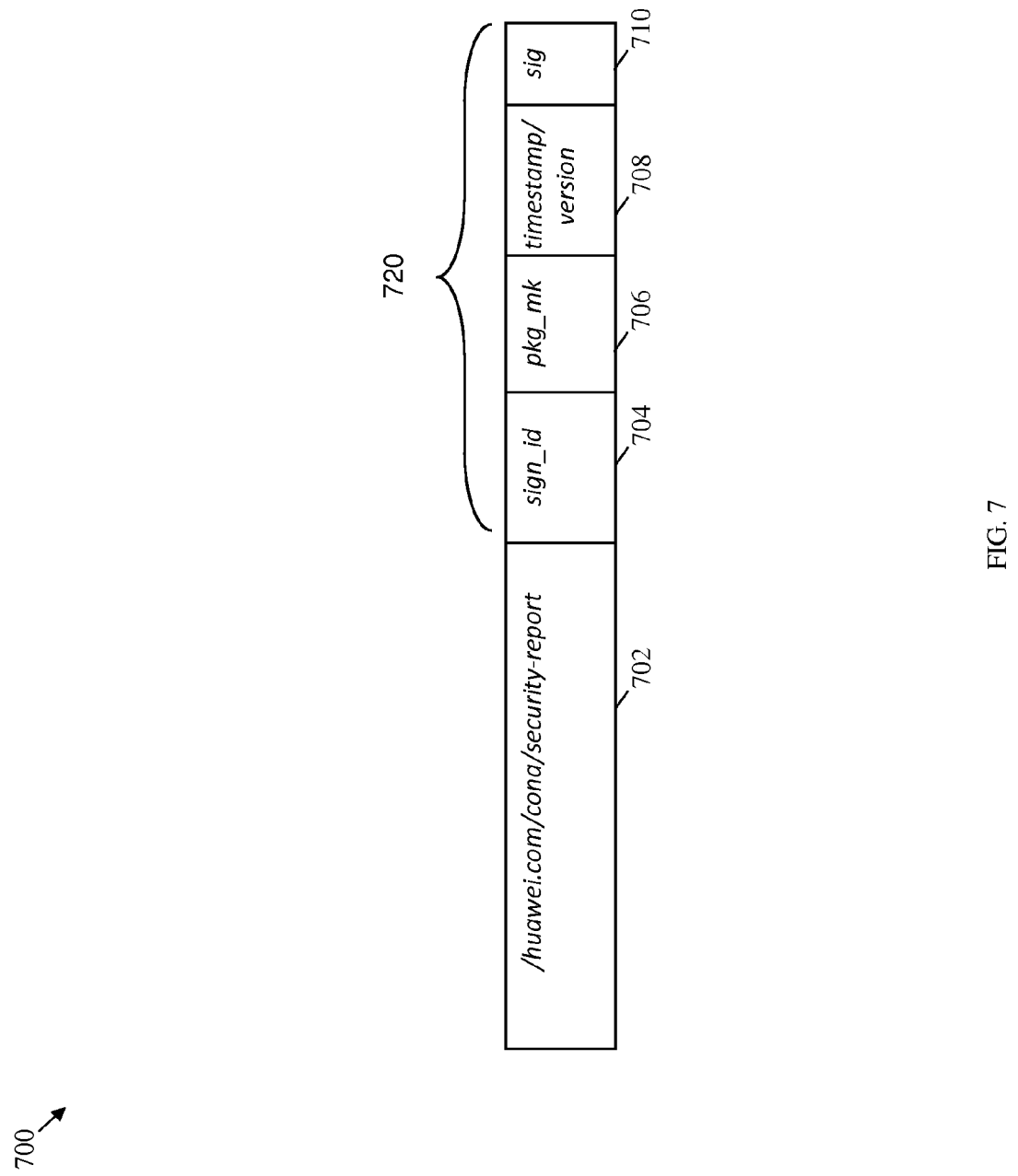
FIG. 7 is a schematic diagram of an embodiment of a content metadata format.

FIG. 7 illustrates an embodiment of a content metadata format 700 that may be cached or stored with content data in a CON in any of the content authentication and encryption schemes above. The content metadata format 700 may comprise a content name 702 and metadata 720. The content name 702 may indicate the name or prefix of the stored/cached content or content object. For example, the content name 702 may comprise /huawei.com/cona/security-report. The metadata 720 may comprise a sign id 704 (sign-id), a PKG MK 706 (pkg_mk), a timestamp/version 708, and a signature (sig) 710. The sign id 704 may correspond to the publisher known public identity (p-id) or the content name or prefix that may be used to obtain a private key for the publisher (pr-p or pr-m) for signing the content. The PKG MK 706 may be generated by the PKG once at setup time, as described above, and used for all publishers in the domain. The PHG MK 706 may indicate the MK value or the name of the MK that may then be used to obtain the MK value from the CON. The timestamp/version 708 may indicate a timestamp and/or version for the cached/stored content. The signature 710 may correspond to a signed hash value of the content name 702, the metadata 710, and the content data.

Figure 8:
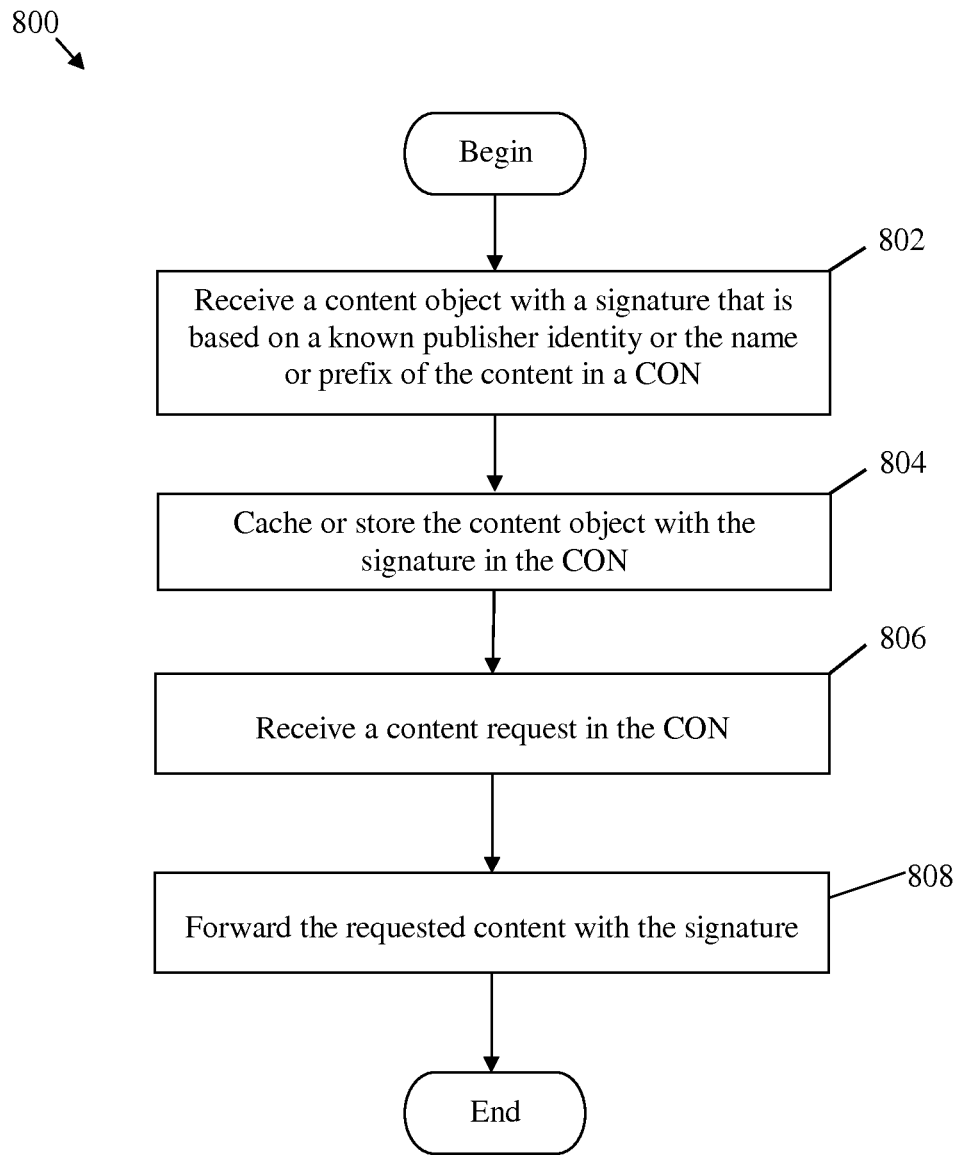
FIG. 8 is a flowchart of an embodiment of a content authentication method.

FIG. 8 illustrates an embodiment of a content authentication method 800 that may be used to provide content integrity and authenticity in a CON. The content authentication method 800 may be implemented by a CON or a content router in the CON. The content authentication method 800 may be based on the content authentication scheme 200 or the content authentication scheme 300. The method 800 may begin at block 802, where a content object with a signature that is based on a known identity may be received in a CON, e.g., by a content router. The received content object may be signed and published by a user or publisher. The signature may be based on a known publisher identity, such as a publisher id (e.g., email or phone number) or the known content name or prefix. The signature may be signed using a private key of the publisher that may be generated using the known identity and obtained from a PKG. If the known identity is a content name or prefix, then the known identity may be registered at a NRS.

At block 804, the content object may be cached or stored with the signature in the CON. The content object may be cached or stored with metadata that includes the signature. The content object may be cached/stored without encryption, e.g., as plaintext, or may be encrypted before caching/storing, e.g., as cyphertext. In some embodiments, the metadata may also include the known identity that was used to obtain the signature. At block 806, a content request may be received in the CON, e.g., by the same or a second content router. The content request may be received from a user or subscriber for the cached/stored content object. At block 808, the requested content with the signature may be forwarded. The content router may forward the cached/stored content to the subscriber with the signature included in the content. The subscriber may then verify the signature using the known identity, as described above. The identity may already be known by the subscriber or may be obtained from the metadata of the content. The method 800 may then end.

Figure 9:
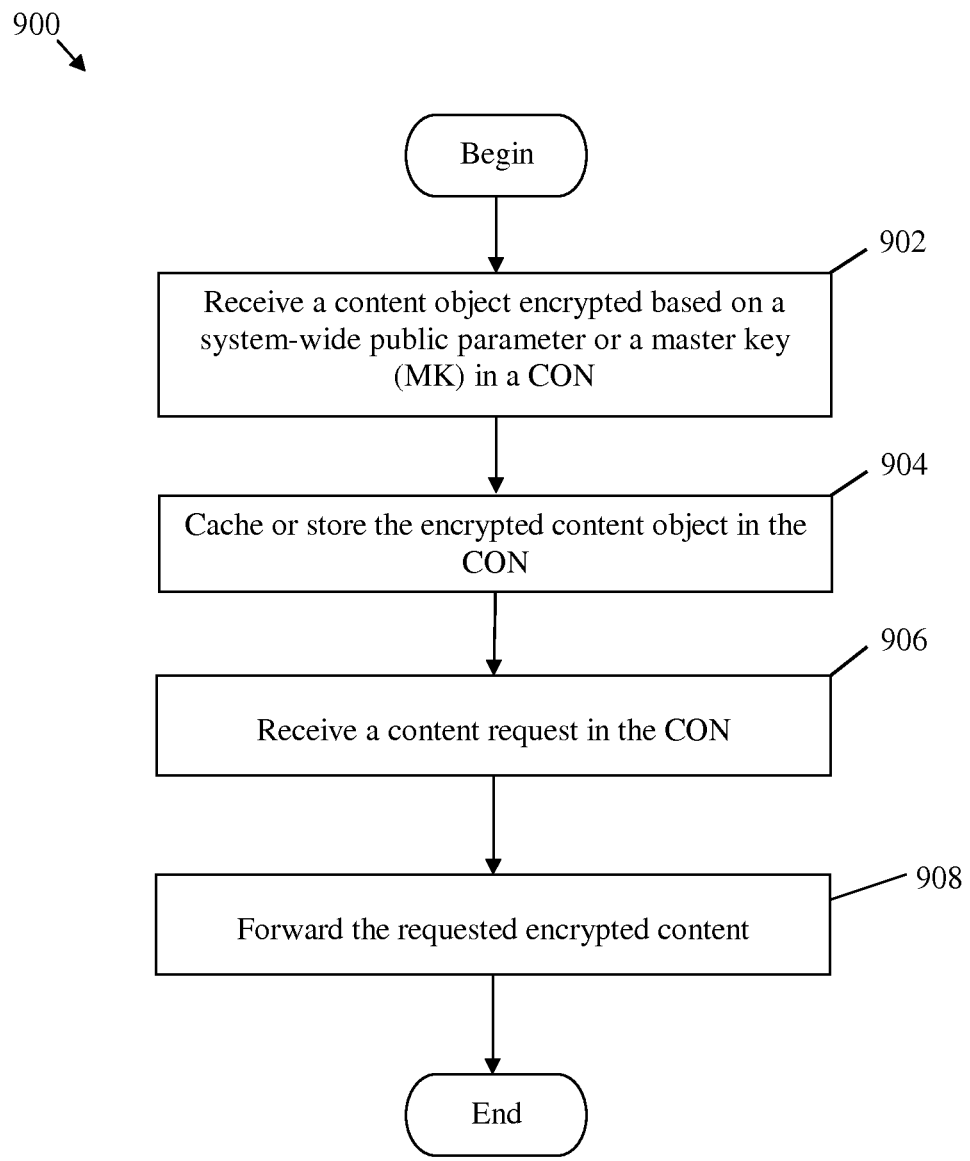
FIG. 9 is a flowchart of an embodiment of a content encryption method.

FIG. 9 illustrates an embodiment of a content encryption method 900 that may be used to provide content security and privacy in a CON. The content encryption method 900 may be implemented by a CON or a content router in the CON. The content encryption method 900 may be based on the content encryption scheme 400 or the content encryption scheme 500. The method 900 may begin at block 902, where a content object encrypted based on a system-wide public parameter or a master key (MK) may be received in a CON, e.g., by a content router. The received content object may be encrypted and published by a user or publisher. The encryption may be based on MK which may be sent from a PKG to the publisher.

At block 904, the encrypted content object may be cached or stored in the CON, e.g., as cyphertext. In some embodiments, the encrypted content may cached/stored with metadata that includes a known identity of the publisher or the content name or prefix. At block 906, a content request may be received in the CON, e.g., by the same or a second content router. The content request may be received from a user or subscriber for the cached/stored content object. At block 908, the requested encrypted content may be forwarded. The content router may forward the cached/stored encrypted content to the subscriber. The subscriber may then obtain a private key for the publisher from the PKG using the known identity of the publisher or the content name or prefix. The subscriber may then use the private key to decrypt the received encrypted content. The identity of the publisher of the content name or prefix may already be known by the subscriber or may be obtained from the metadata of the encrypted content. The method 900 may then end.

Figure 10:
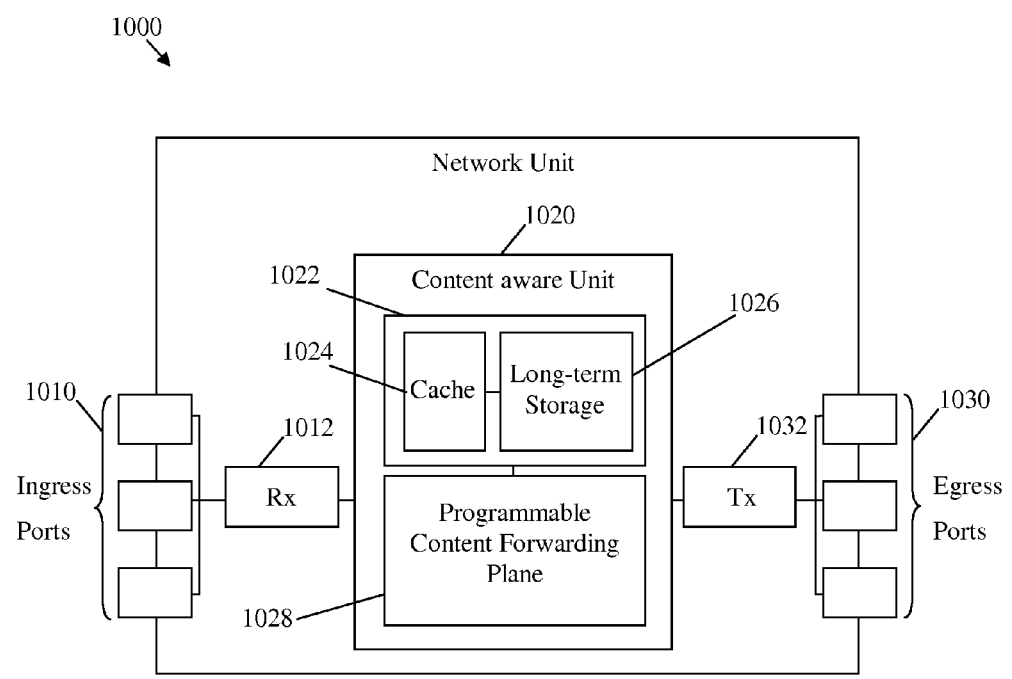
FIG. 10 is a schematic diagram of an embodiment of a network unit.

FIG. 10 illustrates an embodiment of a network unit 1000, which may be any device that transports and processes data through a network. For instance, the network unit 1000 may be located in the content router or any node in the CON 100, or any node in the CON schemes described above. The content router may also be configured to implement or support the CON methods and systems described above. The network unit 1000 may comprise one or more ingress ports or units 1010 coupled to a receiver (R10) 1012 for receiving signals and frames/data from other network components. The network unit 1000 may comprise a content aware unit 1020 to determine which network components to send content to. The content aware unit 1020 may be implemented using hardware, software, or both. The network unit 1000 may also comprise one or more egress ports or units 1030 coupled to a transmitter (T10) 1032 for transmitting signals and frames/data to the other network components. The receiver 1012, content aware unit 1020, and transmitter 1032 may also be configured to implement at least some of the disclosed methods, which may be based on hardware, software, or both. The components of the network unit 1000 may be arranged as shown in FIG. 10.

The content aware unit 1020 may also comprise a programmable content forwarding plane block 1028 and one or more storage blocks 1022 that may be coupled to the programmable content forwarding plane block 1028. The programmable content forwarding plane block 1028 may be configured to implement content forwarding and processing functions, such as at an application layer or L3, where the content may be forwarded based on content name or prefi10 and possibly other content related information that maps the content to network traffic. Such mapping information may be maintained in a content table at the content aware unit 1020 or the network unit 1000. The programmable content forwarding plane block 1028 may interpret user requests for content and accordingly fetch content, e.g., based on metadata and/or content name, from the network or other content routers and may store the content, e.g., temporarily, in the storage blocks 1022. The programmable content forwarding plane block 1028 may then forward the cached content to the user. The programmable content forwarding plane block 1028 may be implemented using software, hardware, or both and may operate above the IP layer or L2. The storage blocks 1022 may comprise a cache 1024 for temporarily storing content, such as content that is requested by a subscriber. Additionally, the storage blocks 1022 may comprise a long-term storage 1026 for storing content relatively longer, such as content submitted by a publisher. For instance, The cache 1024 and the long-term storage 1026 may include Dynamic random-access memories (DRAMs), solid-state drives (SSDs), hard disks, or combinations thereof.

Figure 11:
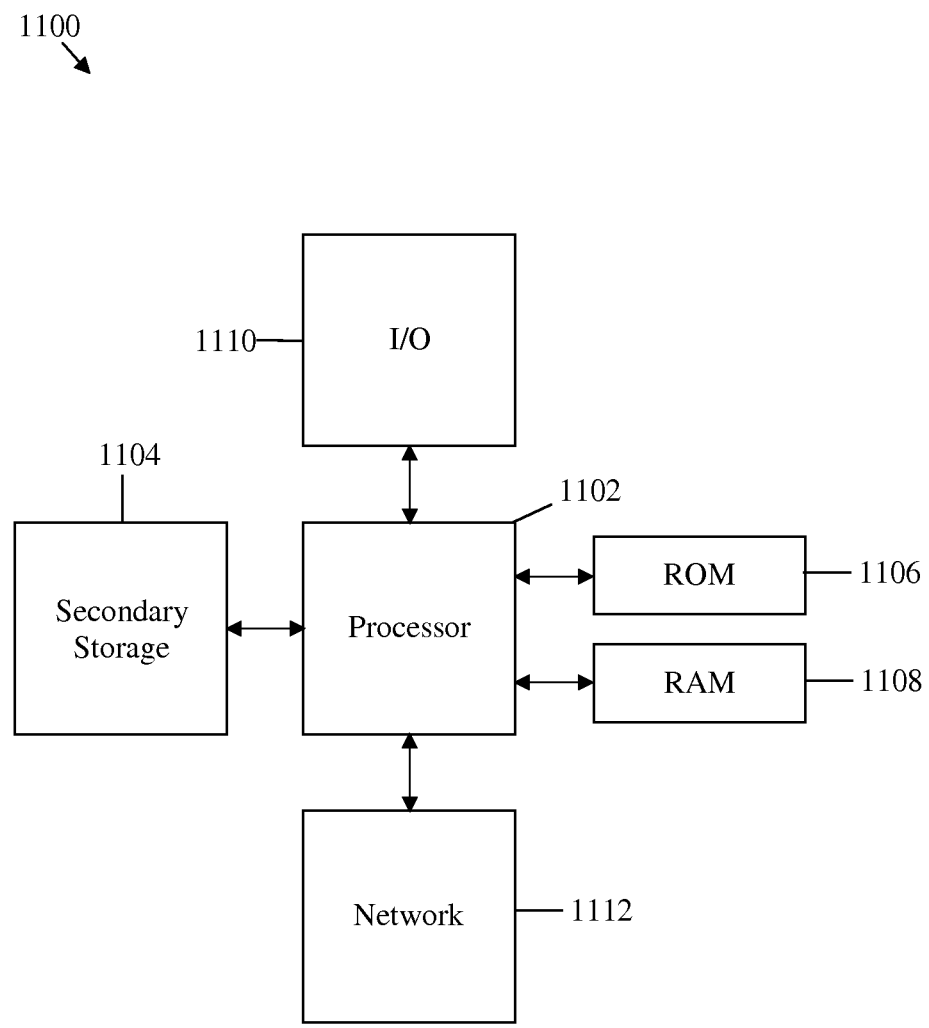
FIG. 11 is a schematic diagram of an embodiment of a general-purpose computer system.

At least some of the methods and network components described above may be implemented on any general-purpose network component, such as a computer or network component with sufficient processing power, memory resources, and network throughput capability to handle the necessary workload placed upon it. FIG. 11 illustrates a typical, general-purpose network component 1000 suitable for implementing one or more embodiments of the components disclosed herein. The network component 1100 includes a processor 1102 (which may be referred to as a central processor unit or CPU) that is in communication with memory devices including secondary storage 1104, read only memory (ROM) 1106, random access memory (RAM) 1108, input/output (I/O) devices 1110, and network connectivity devices 1112. The processor 1102 may be implemented as one or more CPU chips, or may be part of one or more application specific integrated circuits (ASICs).

The secondary storage 1104 is typically comprised of one or more disk drives or tape drives and is used for non-volatile storage of data and as an over-flow data storage device if RAM 1108 is not large enough to hold all working data. Secondary storage 1104 may be used to store programs that are loaded into RAM 1108 when such programs are selected for execution. The ROM 1106 is used to store instructions and perhaps data that are read during program execution. ROM 1106 is a non-volatile memory device that typically has a small memory capacity relative to the larger memory capacity of second storage 1104. The RAM 1108 is used to store volatile data and perhaps to store instructions. Access to both ROM 1106 and RAM 1108 is typically faster than to secondary storage 1104.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A content router comprising:
   a memory;
   a processor coupled to the memory, wherein the memory comprises a storage configured to cache, in a content oriented network (CON), a content object with a signature signed by a publisher based on a known identity to a subscriber;
   a transmitter coupled to the storage and configured to forward the content object with the signature upon request to the subscriber,
   wherein the subscriber uses the signature to verify the content object's integrity based on the known identity without verifying a trust of a publisher key for the publisher, and
   wherein the known identity is trusted by the publisher and does not require verifying trust from the publisher,
   wherein the content object is signed by the publisher using a private key of the publisher that is obtained using the known identity, and
   wherein the private key of the publisher is obtained from a Private Key Generator (PKG) that generates a master key (MK) distributed in the CON and a master secret key (MSK) that is not distributed, and wherein the private key of the publisher is obtained by the publisher using the MSK and the known identity.

2. The content router of claim 1, wherein the known identity is an identity of the publisher that is known to the subscriber or an identity of the content object that comprises a full name or a name prefix of the content object.

3. The content router of claim 2, wherein the identity of the publisher is a public identifier (id) of the publisher that comprises one of an email address, a phone number, an organization name of the publisher, and a local identity within an organization.

4. The content router of claim 1, wherein the content object's authenticity is verified using the signature, the known identity, and the MK.

5. The content router of claim 1, wherein no public key for the publisher is distributed in the CON, and wherein the subscriber does not require and does not use a public certificate from a trusted certificate authority (CA) to establish trust.

6. A network apparatus implemented method comprising:
   receiving a content object with a signature signed from a publisher using a private key that is obtained using a public identity known in a content oriented network (CON), wherein the private key is obtained from a Private Key Generator (PKG) that generates a master key (MK) distributed in the CON and a master secret key (MSK) that is not distributed, and wherein the private key is obtained by the publisher using the MSK and the known identity;
   storing the content object with the signature in the CON; and
   forwarding the content object with the signature upon receiving a content request to a subscriber.

7. The network apparatus implemented method of claim 6, wherein the PKG generates the MK and the MSK only once and uses the same MSK and the public identity for generating a plurality of private keys for a plurality of publishers using a plurality of corresponding public identities.

8. The network apparatus implemented method of claim 7, wherein the private key is obtained by the publisher from the PKG only once and uses the same private key for signing a plurality of content objects, and wherein the private key is obtained by the publisher from the PKG.

9. The network apparatus implemented method of claim 7, wherein the subscriber verifies the signature using the public identity and the MK from the PKG without using a secure channel between the PKG and the subscriber, and wherein the subscriber gets the MK from the PKG only once and uses the same MK for verifying a plurality of content objects.

10. The network apparatus implemented method of claim 7, wherein the CON comprises a plurality of domains that comprise a plurality of corresponding publishers, subscribers, and PKGs, and wherein a subscriber in a first domain verifies a signature of a content object signed by a publisher in a second domain using a second MK generated by a PKG in the second domain and signed using a second private key in the second domain generated by a public key infrastructure (PKI) of the CON, and wherein the subscriber verifies the authenticity of the second MK using a public key in the second domain generated by the PKI and corresponding to the second private key and verifies the authenticity of the public key using a certificate from a trusted certificate authority (CA).

11. The network apparatus implemented method of claim 6, wherein the publisher signs a plurality of content objects that have the same name or prefix with the same private key based on the name or prefix, and wherein the publisher delegates signing the content object to another user or service in an organization.

12. The network apparatus implemented method of claim 6, wherein the subscriber uses the same public identity to verify the same content object that is published by a group of users or a plurality of publishers using the same name or prefix.

13. The network apparatus implemented method of claim 6, wherein a plurality of public identities are used to sign the content object using different names or prefixes or different publisher's identities.

14. An apparatus comprising:
- a receiver configured to receive a content object with a signature signed from a publisher using a private key that is obtained using a public identity known in a content oriented network (CON);
- a storage coupled to the receiver and configured to cache the content object; and
- a transmitter coupled to the storage and configured to forward the content object with the signature from the cache upon request to a subscriber,
- wherein the known identity is trusted by the publisher and does not require verifying trust from the publisher, and
- wherein the private key is obtained from a Private Key Generator (PKG) that generates a master key (MK) distributed in the CON and a master secret key (MSK) that is not distributed, and wherein the private key is obtained using the MSK and the known identity.

15. The apparatus of claim 14, wherein the PKG generates the MSK with the MK, and wherein the PKG generates the MK and the MSK only once and uses the same MSK and the public identity for generating a plurality of private keys for a plurality of publishers using a plurality of corresponding public identities.

16. The apparatus of claim 14, wherein the transmitter is further configured to send the content object to a subscriber that decrypts the encrypted content using a private key obtained using an identity associated with the publisher or the content object and the MSK.

17. The apparatus of claim 14, wherein the private key is obtained without using a public key infrastructure (PKI).

18. The apparatus of claim 14, wherein no public key for the publisher is distributed in the CON, and wherein the subscriber does not require and does not use a public certificate from a trusted certificate authority (CA) to establish trust.

\* \* \* \* \*